United States Patent [19]

Molusis et al.

[11] 4,431,988

[45] Feb. 14, 1984

[54] MICROPROCESSOR-BASED KEYBOARD/DISPLAY UNIT FOR CONFIGURING CONTROL INSTRUMENTS

[75] Inventors: Anthony J. Molusis, Southington; Thomas M. O'Loughlin, Milford, both of Conn.

[73] Assignee: Bristol Babcock Inc., Waterbury, Conn.

[21] Appl. No.: 227,969

[22] Filed: Jan. 23, 1981

[51] Int. Cl.$^3$ .............................................. G09G 3/00
[52] U.S. Cl. ............................. 340/712; 340/365 VL; 340/717; 340/721; 340/825.22
[58] Field of Search ............... 340/711, 712, 717, 722, 340/365 C, 365 VL, 365 R, 825.22

[56] References Cited

U.S. PATENT DOCUMENTS

| | | | |
|---|---|---|---|
| 3,879,722 | 4/1975 | Knowlton | 340/365 VL |
| 4,001,807 | 1/1977 | Dallimonti | 340/722 |
| 4,107,784 | 8/1978 | Van Bemmelin | 340/365 VL |
| 4,303,973 | 12/1981 | Williamson, Jr. et al. | 340/712 |

OTHER PUBLICATIONS

*Programmable Keytop Employing Electrochromic Display*, Jones IBM Tech. Discl. Bull., vol. 21, No. 4, 9/78, pp. 1671–1672.

*Primary Examiner*—Marshall M. Curtis
*Attorney, Agent, or Firm*—Pennie and Edmonds

[57] ABSTRACT

A microprocessor-based keyboard/display is described in which the function of the keys can be varied automatically depending on the instrument to which the keyboard/display is connected. The keyboard/display comprises a microprocessor, a read only memory in which is stored an operating program for the microprocessor, a keyboard having a plurality of keys, a display, and means for connecting said microprocessor to another instrument. In accordance with the invention, the program stored in said read only memory is responsive to a signal from the instrument to which said keyboard/display is connected whereby upon receipt of a signal from one type of instrument at said keyboard/display at least some of said keys of said keyboard are given first functions and upon receipt of a signal from a second type of instrument said keys are given different functions. Further in accordance with the invention, the keyboard/display comprises a random access memory in which may be stored data derived from one instrument to which said keyboard/display is connected and from which may be read data from said keyboard/display. Advantageously, the keyboard/display can be used with a recorder to provide for print out of the data stored in the random access memory of the keyboard/display.

6 Claims, 4 Drawing Figures

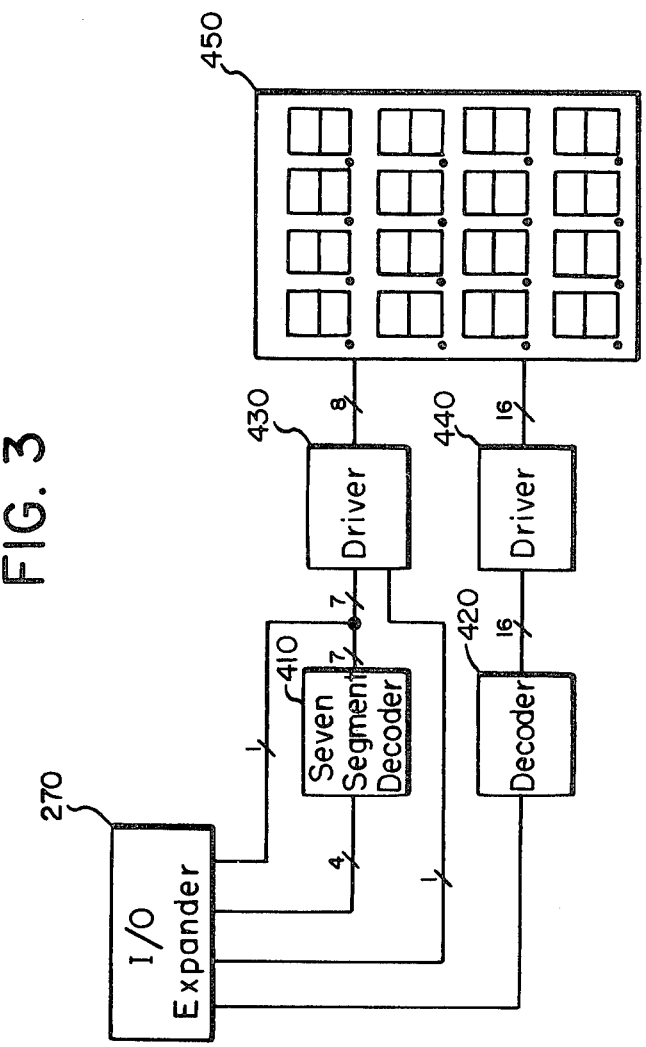

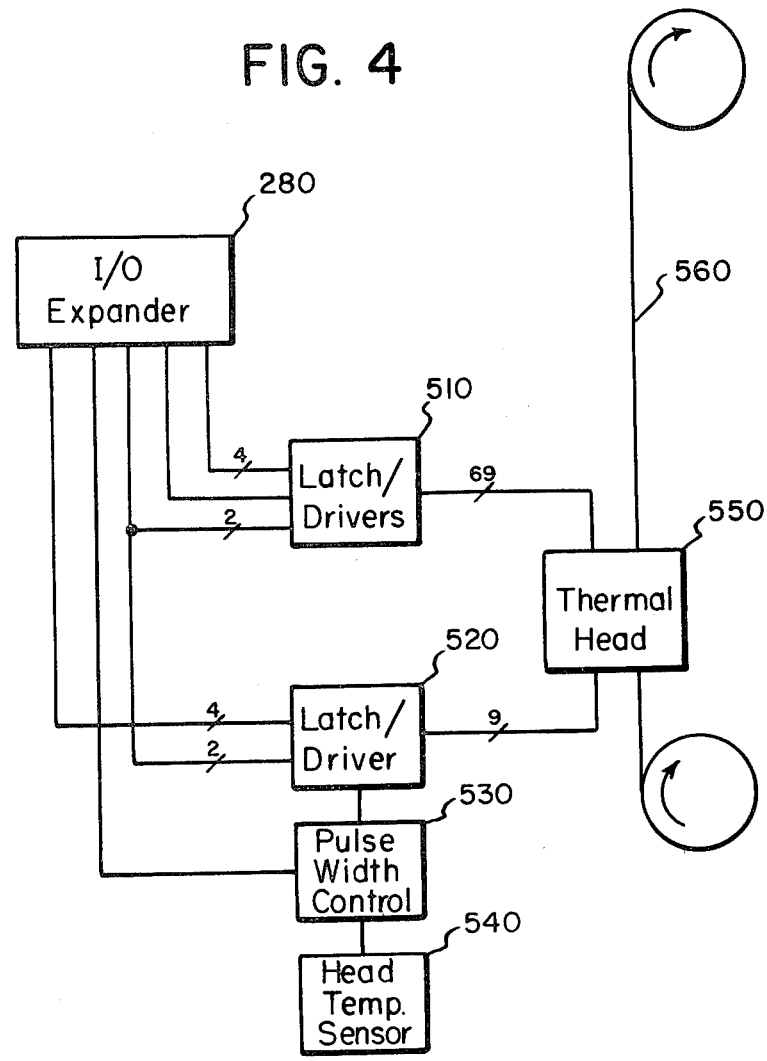

MICROPROCESSOR-BASED KEYBOARD/DISPLAY UNIT FOR CONFIGURING CONTROL INSTRUMENTS

CROSS REFERENCE TO RELATED APPLICATION

A related application is "Single Loop Control System", Ser. No. 227,970, filed concurrently herewith and assigned to Bristol Babcock Inc. This application is incorporated herein by reference.

TECHNICAL FIELD

This relates to an intelligent keyboard/display especially useful in configuring a microprocessor-based single loop control (SLC) system used for process control.

BACKGROUND OF THE INVENTION

Process control systems are used in numerous applications to regulate one or more parameters of a process. Most control systems are closed loop control systems in which information about a controlled variable is fed back to a controller to serve as the basis for control of one or more process variables. A signal representative of the controlled variable is compared by the controller with a preset desired value, or set point, of the controlled variable. If there is a difference, the controller produces an output such as to reduce the difference by manipulating one or more of the process variables. For example, the controlled variable might be the temperature of an effluent stream from a mixing tank; and the process variables might be the temperature and flow rates of the streams emptying into the tank as well as the speed of a mixer in the tank. If the temperature of the effluent is too low, the controller might open a little more a valve regulating the flow of one of the streams emptying into the tank or adjust the speed of the mixer.

Many linear-feedback control systems can be represented by the input-output relationship:

$$\frac{C}{R} = \frac{KG}{1 + KGH},$$

where C is the output, R is the set point, KG is the forward-loop transfer function, H is the feedback loop transfer function, and KGH is the open-loop transfer function.

For many processes it can be shown that the best controller is one which provides proportional, integral and derivative (PID) control. Proportional control of a first order process reduces the time constant of the system and the apparent gain of the process. However, it also introduces a deviation, or offset, between the time average of the controlled variable and the set point. This offset can be compensated for by providing for integral, or reset, control in addition to proportional control. Although the use of integral control tends to slow the response of the system, derivative control counters this by tending to anticipate where a process is going so that it can correct for the change in error. Ideally, the PID transfer function is given by the following equation:

$$\frac{M(s)}{E(s)} = K_c \left( 1 + \frac{1}{T_i s} + T_d s \right),$$

where M is the manipulated variable, E is the error, $K_c$ is the controller gain, $T_i$ is the reset time and $T_d$ is the rate or derivative time. Each manufacturer of PID controllers typically uses a somewhat different transfer function. Numerous techniques are available to design or tune PID controllers to practical application. Details concerning many of these techniques are set forth in Section 22 of Perry & Chilton, Chemical Engineer's Handbook (McGraw Hill, 5th Ed. 1973).

Until quite recently most process controllers were analog devices because analog circuitry was the only cost effective way to build a single-loop controller. Such devices, however, could not easily be modified and could not execute complex control algorithms. As a result, they tended to be expensive and/or had limited capability.

SUMMARY OF THE INVENTION

To facilitate the reconfiguring of single loop control instruments and the like, a microprocessor-based keyboard/display has been devised in which the function of the keys can be varied automatically depending on the instrument to which the keyboard/display is connected. The keyboard/display comprises a microprocesor, a read only memory in which is stored an operating program for the microprocessor, a keyboard having a plurality of keys, a display, and means for connecting said microprocessor to another instrument. In accordance with the invention, the program stored in said read only memory is responsive to a signal from the instrument to which said keyboard/display is connected whereby upon receipt of a signal from one type of instrument at said keyboard/display at least some of said keys of said keyboard are given first functions and upon receipt of a signal from a second type of instrument said keys are given different functions. Further in accordance with the invention, the keyboard/display comprises a random access memory in which may be stored data derived from one instrument to which said keyboard/display is connected and from which may be read data from said keyboard/display. Advantageously, the keyboard/display can be used with a recorder to provide for print-out of the data stored in the random access memory of the keyboard/display.

BRIEF DESCRIPTION OF DRAWING

These and other objects, features, elements and advantages of the invention will more readily be apparent from the following description of the best mode of practicing the invention in which:

FIGS. 3 and 4 are schematic diagrams illustrating details of the records of FIG. 2.

BEST MODE OF PRACTICING THE INVENTION

Figure 1:
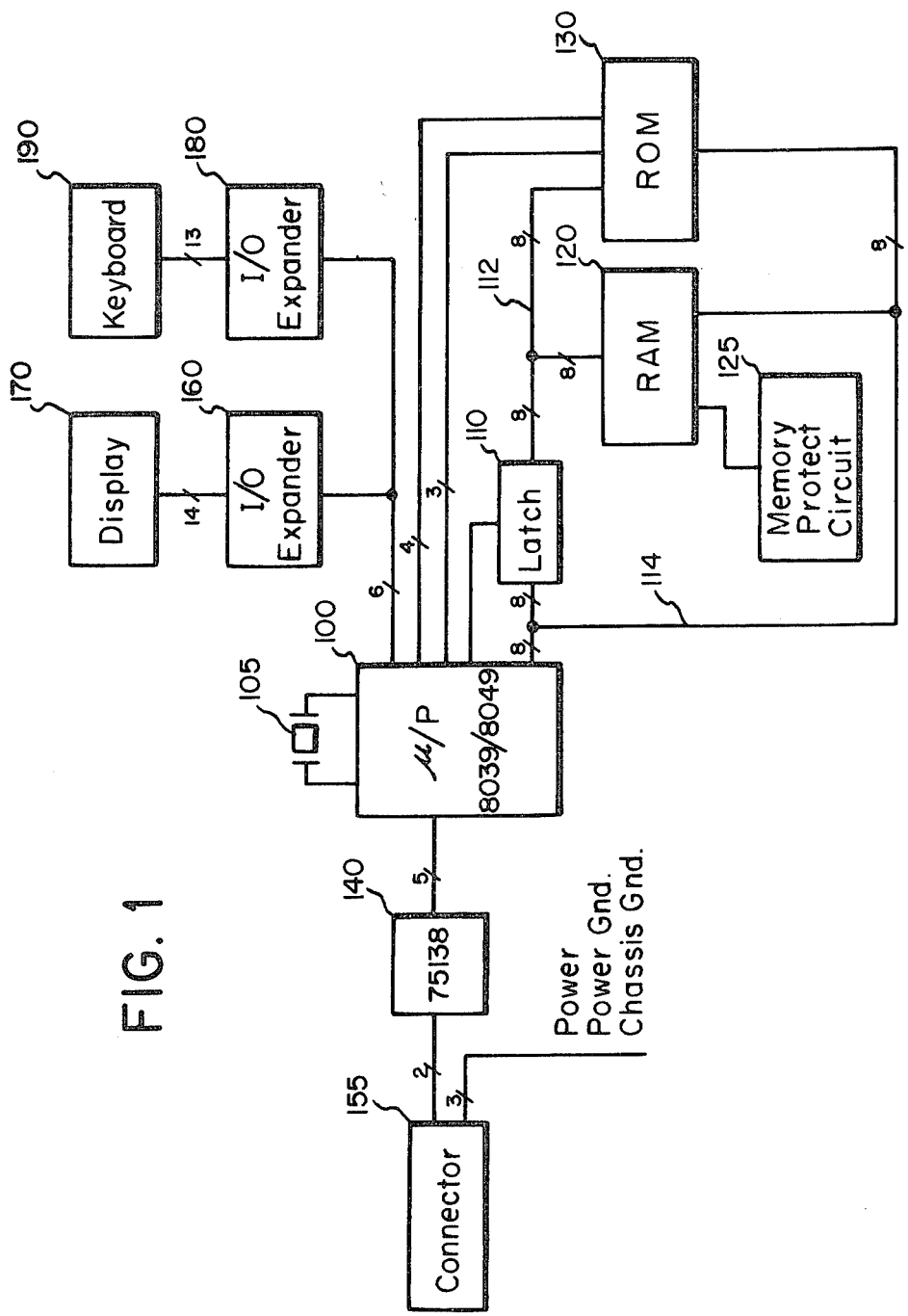
FIG. 1 is a schematic diagram of an illustrative embodiment of a keyboard/display of the present invention.

A schematic diagram of an intelligent keyboard/display of the present invention is set forth in FIG. 1. As shown thereon, the keyboard display comprises a microprocessor 100, a latch 110, a random access memory (RAM) 120, a memory protection circuit 125, a read only memory (ROM) 130, I/O expanders 160, 180, a display 170 and a keyboard 190. In addition, the keyboard/display comprises a communication multiplexer 140 and a connector 155.

Illustratively, microprocessor 100 is an 8039/8049 Intel microprocessor with a six Mhz clock crystal 105. Latch 110 is a 373-type octal D-type flip-flop which controls an address bus 112 in response to a signal from microprocessor 100. Address bus 112 provides eight bits of address to RAM 120 and ROM 130. Data from these units is returned to microprocessor 100 on an eight bit parallel data bus 114. RAM 120 is a pair of 5101-type 256×4 bit CMOS memory chips connected together to provide 256 bytes of random access storage. Two control lines from microprocessor 100 control the operation of writing into and reading from these chips. RAM 120 permits data to be copied between the intelligent keyboard/display and an SLC instrument such as a controller or a recorder. The stored data is protected against power failure by a long-life battery in memory protection circuit 125. ROM 130 is four units of 2K×8 bit memory such as a 2716-type read only memory. Each ROM unit is addressed by the eight address lines of bus 112 and three additional address lines. Four additional lines select the individual ROM chip. The operating program for the intelligent keyboard/display is stored in ROM 130. This program scans keyboard 190, debounces the signal from a key and generates a code for the particular key depressed. Several look-up tables, one for each different type of SLC instrument, are stored in ROM for interpreting these codes in accordance with the instrument to which the keyboard/display is connected. It also provides for the display of one or more characters at specified positions on display 170. Further the program generates the timing signals and controls required to send and receive serial data through connector 155.

I/O expanders 160, 180 are 8243-type coder/decoders capable of producing an output signal on one of sixteen lines on the decoded side of the expander in accordance with a four bit signal received on the coded side and capable of producing a four bit coded output signal on the coded side of the expander in response to a signal received on one of sixteen lines on the uncoded side of the expander. I/O expander 160 provides an interface to display 170; and I/O expander 180 provides an interface to keyboard 190. Display 170 is an eight character alphanumeric display which illustratively is supplied by a pair of Litronics DL1414 display chips. Keyboard 190 is a nine row by five column Texas Instruments keyboard. Communications multiplexer 940 is a 75138-type multiplexer which controls the transmission of signals to and from microprocessor 100 and the device to which the keyboard/display is connected. Connector 155 is adapted to mate with connectors 255, 415 and 755 shown in FIGS. 2, 3 and 5 of the above-referenced "Single Loop Control System".

The intelligent keyboard/display of FIG. 1 provides a means of reading data from and entering data into any one of the controller board, the front panel board and the auxiliary board described in "Single Loop Control System" as well as other devices such as a recorder. Of particular interest, the keyboard/display provides a means for displaying many of the numerous variables which are generated by the microprocessors on those boards or are received as inputs at those boards. For example, the apparatus described in "Single Loop Control System" has up to six analog inputs and six digital inputs and produces up to eight outputs with options as to the number of analog and digital outputs. In addition, the keyboard/display provides a means for selecting many different operating options of the programs stored on these boards as well as a means for overriding certain input signals. Thus, the keyboard/display has the ability to alter the configuration of the particular controllers to which it is connected. The keyboard/display also has the capability of reading and storing the operating configuration of the controller. The configuration can then be read out from the keyboard/display and printed by a suitable recorder.

The keyboard used when the keyboard/display is connected to a controller is shown in Table 1.

TABLE 1

| IN OP | LIN OP | FLTR | DI | AI |
|---|---|---|---|---|
| SP | L/R SP | LSP | RSP | TRK OP |
| RAT MAX | L/R RAT | L RAT | R RAT | IN SP |
| SRC OP | FAIL OP | SAFE SP | RSP HL | RSP LL |
| PV1 OP | PID OP | PV ALM | DEV | DEV1 ALM |
| PV | $K_P$ | $K_I$ | $K_D$ | TV |
| TV OP | P OP | I OP | D OP | TV BKPT |
| FF OP | FF IN | FF k | FF OUT | AO 3 |
| DB | INHB OP | OUT OP | A03 OP | OUT3 OP |
| D03 OP | VPFB | OUT | DO | DDC OUT |
| H OVR OP | L OVR OP | OUT HL | OUT LL | H/L SEL |
| H OVR | L OVR | 7 | 8 | 9 |
| ID | ↑ ↑ | COMM | ALM ACK | MODE |
| NEXT | ↑ | 4 | 5 | 6 |
| ENTER | ↓ ↓ | EU 0% | EU 100% | EU ID |
| READ | ↓ | 1 | 2 | 3 |
| CLR | SHIFT | AUTH 0 | UNITS . | DIAG +/− |

To read data from or enter data into a unit, the keyboard/display is first initialized by plugging it into the unit. The keyboard/display will then query the instrument it has been plugged into for identification and upon receiving a reply will display some unique identifier such as LMR for an L-M-R controller, RECORDR for a recorder, etc. At the same time, it will select one of the look-up tables which interpret the function of the keys of the keyboard.

To examine any accessible variables, options, etc. the READ function is used. One, two or three keystrokes are used to identify the desired variable. A "lower case" key requires one keystroke. Examples are SP for setpoint and OUT for the output. "Upper case" keys require the SHIFT key to be pressed before the variable keystroke. An example is SHIFT DEV for deviation. Finally, some variables are subscripted; these require a number to be entered. Examples of these are DO 2 for the second digital output and SHIFT AI 6 for analog input number 6. When a subscripted key is pressed, an underline symbol . is displayed to prompt the user. If no number is entered, 1 is automatically used. Otherwise, the appropriate number key should be depressed. As the keys are pressed, the display will display the keystroke. This is called the ID or identifier hereinafter.

After the variable has been selected, the READ key is pressed. The intelligent keyboard then obtains the requested data from the SLC instrument and displays it as follows:

$$=n\,n\,n\,n\,n\,n\,I$$

The equal sign, =, means that the value displayed is the current value. The next 6 characters (nnnnnn) may be numeric or alphanumeric depending on the variable. If numeric, the first character is either blank or a minus sign. The next 5 characters are 4 digits plus a decimal point. Numeric values may range from 0.0001 to 9999. If alphabetic, up to 4 characters are displayed. Examples are G/M, PSIG, AMPS, V. If the item is an option, an alphanumeric string up to seven characters may be displayed. Examples are 0–5V, LINOP 1, V**½.

The last character, I, is a special identifier used with numeric values. The following table describes the various identifiers:

| Identifier | Description |
| --- | --- |
| blank | a unitless value (e.g., a ratio) |
| V | volts (e.g., an analog input) |
| % | percentage, most values are displayed in % |
| P | identifies the proportional constant used in the controller |
| I | identifies the integral constant used in the controller |
| D | identifies the derivative constant used in the controller |
| * | engineering units used with a variable (e.g., PV) |

To display a dynamically changing value such as the process variable the READ key is held down. New values will then be displayed by the intelligent keyboard.

The final key associated with the read function is ID. This key will display the identifier of the currently displayed variable on the display. For example, if a local setpoint value is displayed and ID is pressed, the display will change to LSP.

The ENTER function is used to change various values, options, etc. in the SLC instruments. To enter a new value, the variable must first be read and displayed as above.

To change a numeric value the following procedure is used:
1. Press CLEAR. A zero is displayed.
2. Use the numeric keys (0 through 9, decimal point and +/−) to enter the new value. Up to 4 digits may be entered.
3. Press SHIFT ENTER. An equal sign = will be displayed to the left of the value (after a short delay) indicating that the new value was entered into the SLC instrument.

If a mistake is made in step 2 or 3, CLEAR is pressed and a new value is entered. The variable is not changed until ENTER is pressed and the equal sign is displayed. If verification is desired, CLEAR is pressed to clear the display, followed by READ to display the current value.

Some variables are read-only because they cannot be changed from the intelligent keyboard. Examples are analog inputs and calculated variables. The read-only items continue to be displayed if CLEAR is pressed. This informs the user that the variable is read-only.

Certain variables have been made more difficult to change in order to prevent the operators from inadvertently reconfiguring the SLC instrument. These variables are usually changed only by qualified personnel. To change a protected variable, it is necessary first to read it; then to press SHIFT AUTH. CLR, then to enter the value (or slew it), and finally to press SHIFT ENTER to enter it. The equal sign will again be displayed to indicate that the change was made. If this procedure is not followed, the variable will not be changed.

The intelligent keyboard also has a slewing feature which performs 2 distinct functions: changing numeric variables, and selecting non-numeric variables. Two keys, raise, ↑, and lower, ↓, are used for slewing:

For numeric slewing any changable numeric value may be slewed. The advantage of slewing over entry of a new value is that a large bump is prevented. The rate at which the variables is slewed depends on the type of variable, its current value and the activity on the system's communication bus. By pressing the SHIFT key along with raise, ↑, or lower, ↓, the variable will slew at 15 times the slow slew rate.

For analog output and stepper output slewing, the rate is approximately 1%/second for a slow slew, and 15%/second for fast. For variables represented in percent and for variables with engineering units, the slow slew is a fixed value approximately 1% of full scale per second. Finally, for unitless variables, a fixed increment is added to the value as a function of the value:

| current value | increment |
| --- | --- |
| V< 1 | 0.0001 |
| 1<V< 10 | 0.001 |
| 10<V< 100 | 0.01 |
| 100<V< 1000 | 0.1 |
| 1000<V | 1.0 |

Again the fast slew is 15 times the slow slew increment.

All of the above slew rates assume no other communication is occurring. If there is other communication (such as updating the controller's bar graph display) the slew rates will slow down to approximately ½ or ⅔ of the stated rates.

Certain keys refer to features and options that can have several possible states. When the appropriate key is pressed to display such a feature or option, the display will be:

$$=a\,a\,a\,a\,a\,a\,x,$$

where a a a a a a is a 1 to 6 character identifier for the section and x is either a blank if the identifier refers to the currently active state of the feature or option or a question mark if the identifier refers to an alternative state. To change the setting, the slew keys are used to get the desired option into the display. Next, SHIFT and ENTER are pressed. After a short delay, the question mark will disappear to indicate that the setting has been selected.

For example, the Controller's analog output #3 may be used for output, setpoint (SP), process variable (PV) or be turned off. Suppose it is set for output but PV is desired. The user may press the following key sequence:

| Keystroke Sequence | Display Sequence | Comments |
|---|---|---|
| SHIFT AO3 OP | — AO3 OP | keystroke is displayed |
| READ | = OUT | currently active variable is displayed |
| ↓ | = OFF? | another choice (note the ?) is displayed |
| ↓ | = OFF? | since the OFF option is at the end of the stored table of options, the display remains the same |
| ↑ | = OUT | current setting (note absence of the ?) is displayed as display moves in the other direction in the stored table of options |
| ↑ | = SP? | another choice is displayed |
| ↑ | = PV? | another choice is displayed |
| SHIFT ENTER | = PV | PV is selected for display and the question mark disappears indicating the change has been made. |

A key labelled NEXT is provided to allow stepping through all of the variables, constants and options in an SLC instrument's data base. This function will reduce the number of keystrokes necessary for the user to view all of the data. When NEXT is pressed, the identifier for the next item is displayed. Typically, the user will alternately press NEXT and READ to view all of the data. When the last item is reached, the NEXT function will stop operating.

Table 2 indicates the functions and operation of the individual keys of the keyboard when the keyboard/display is connected to a controller. Table 3 indicates the displays that can be generated by repeated use of the NEXT key.

TABLE 2

| KEYBOARD SEQUENCE | DISPLAY SEQUENCE | COMMENTS |
|---|---|---|
| | AI | |
| | | Read the 6 analog input values (in volts) |
| AI k | AI k | k = 1-6 |
| READ | = nnnnnn V | |
| | IN OP | |
| | | Read/enter the input range option (0-5 or 1-5V) for each of the 6 analog inputs |
| IN OP k | IN OP k | k = 1-6 |
| READ | = 0-5V = 1-5V | two options |
| ↑ ... ↓ | = one of above? | New option being selected by Raise and Lower keys;? appended to non-active option |
| ENTER | = one of above | New Option selected;? disappears |
| | LIN OP | |
| | | Read/enter the linearization option for each of the 6 analog inputs (5 choices) |
| LIN OP k | LIN OP k | k = 1-6 |
| READ | | The 5 choices are: |
| | = OFF | Not used |
| | = V | Direct |
| | = V**1/2 | Square-root |
| | = V**3/2 | "Three halves" |
| | = V**5/2 | "Five halves" |
| ↑ ... ↓ | = one of above? | Question mark appended to all but the currently active option. |
| ENTER | = one of above | New option selected (? disappears) |
| | FLTR | |
| | | Read/Enter the software filter (0.15 HZ) option for each analog input |
| FLTR k | FLTR k | k = 1-6 |
| READ | = OFF = ON | One of 2 options, OFF = 1.5 HZ ON = 0.15 HZ |
| ↑ ... ↓ | = one of above? | ? appended to non-active option |
| ENTER | = one of above | other option selected; (? disappears) |
| | DI | |
| | | Read the current state of the 6 digital inputs |
| DI k | DI k | k = 1-6 |
| READ | = ON = OFF | ON = HI OFF = LO |
| | SP | |
| | | Read the current setpoint value (subscripted for Cascade and Selector only) |
| SP k | SP k | k = 1,2 (= 2 for selector and cascade models) |
| READ | = nnnnnn* | Value in engineering units |
| | LSP | |
| | | Read/enter the value of the local setpoint (subscripted for Cascade and Selector only) |
| LSP k | LSP k | K = 1,2 (= 2 for selector and cascade models) |
| READ | = nnnnnn* | Value in engineering units |
| m m ... m | mmmmmm* | New value being entered in engineering units |
| ENTER | = mmmmmm* | Value entered (note equal sign) |
| | RSP | |
| | | Read the value of the remote setpoint (subscripted for Cascade and Selector only) |
| RSP k | RSP k | k = 1,2 (= 2 for selector and cascade models) |
| READ | = nnnnnn* | Value in engineering units |
| | L/R SP | |
| | | Read/enter the local/remote option for the current setpoint (for the DDC, and SELECTOR models only) |
| L/R SP k | L/R SP k | K = 1,2 (= 2 for selector only) |
| READ | = L = R | One of 2 options (local SP, remote SP |
| ↑ ... ↓ | = one of above? | ? appended to non-active option |
| ENTER | = one of above | New option selected by users; (? disappears) |
| | TRK OP | |
| | | Read/enter the setpoint track option |
| TRK OP | TRK OP | |
| READ | = ON = OFF | One of two options (OFF = no tracking) |
| ↑ ... ↓ | = one of above? | ? appended to non-active option |
| ENTER | = one of above | New option selected (? disappears) |
| | L/R RAT | |
| | | Read/enter the ratio-value source being applied to the SP (RATIO model only) |
| L/R RAT | L/R RAT | |
| READ | = L | One of two options |

TABLE 2-continued

| KEYBOARD SEQUENCE | DISPLAY SEQUENCE | COMMENTS |
|---|---|---|
| | = R | (Local ratio, remote radio) |
| ↑ ... ↓ | = one of above? | ? appended to non-active option |
| ENTER | = one of above | New option selected (? disappears) |
| | RAT MAX | |
| RAT MAX | RAT MAX | Read/enter the 100% value of the Ratio setting |
| READ | = nnnnnn | Current value |
| m.m.m | mmmmmm | New value being entered |
| ENTER | = mmmmmm | New value entered (note equal sign) |
| | L RAT | |
| | | Read/enter the local ratio value applied to SP1 (Ratio model only) |
| L RAT | L RAT | |
| READ | = nnnnnn% | value (Read out in percent) |
| m m ... m | mmmmmm% | new value being entered by user |
| ENTER | = mmmmmm% | Value entered (note = sign) |
| | R RAT | |
| | | Read the remote ratio value being applied to SP1 (Ratio model only) |
| R RAT | R RAT | |
| READ | = nnnnnn% | Valve (Read out in percent) |
| | IN SP | |
| | | Read the value of the input SP (raw, unratioed) (Ratio model only) |
| IN SP | IN SP | |
| READ | = nnnnnn* | Value in engineering units |
| | SRC OP | |
| | | Read the computer SP or DDC output option (Computer and DDC models only) |
| SRC OP | SRC OP | |
| READ | = AI | AI = Positional algorithm |
| | = PULSE | DI = Velocity algorithm |
| | = COMM | COMM = Serial Communication |
| | FAIL OP | |
| | | Read/select the computer's fail option. (Computer and DDC models only) |
| FAIL OP | FAIL OP | One of 4 options: |
| READ | = MAN | - Switch to manual |
| | = LAST | - Switch to local with last SP |
| | = SAFE | - Switch to local with safe SP |
| | = HOLD | - Stay in present mode, ignoring computer |
| ↑ ... ↓ | = one of above? | ? appended to all non-active options |
| ENTER | = one of above | New option selected (? disappears) |
| | SAFE SP | |
| | | READ/enter the value of the "Safe SP" for the fail option (Computer and DDC model's only) |
| SAFE SP | SAFE SP | |
| READ | = nnnnnn* | SP's current value in engineering units |
| m m ... m | mmmmmm* | Value being entered |
| ENTER | = mmmmmm* | Value entered (note equal sign) |
| | RSP HL | |
| | | Read/enter the upper limit on the remote setpoint (subscripted for cascade and selector) |
| RSP HL (k) | RSP HL k | k = 1,2 (= 2 selector, cascade models) |

TABLE 2-continued

| KEYBOARD SEQUENCE | DISPLAY SEQUENCE | COMMENTS |
|---|---|---|
| READ | = nnnnnn* | Value in engineering units |
| m m ... m | mmmmmm* | Value being entered |
| ENTER | = mmmmmm* | Value entered (note equal sign) |
| | RSP LL | |
| | | Read/enter the lower limits(s) on the remote setpoint(s) |
| - Identical to RSP HL | | |
| | PV1 OP | |
| | | Read/select the process variable options |
| PV1 OP | PV1 OP | |
| READ | | There are 6 choices: |
| | = AI | AI1 only |
| | = AVG | (AI1 + AI3)/2 |
| | = DIF | AI1 − AI3 |
| | = PROD | AI1*AI3 |
| | = MAX | the higher of AI1 and AI3 |
| | = MIN | the lower of AI1 and AI3 |
| ↑ ... ↓ | = one of above?Question mark appended to all but the active options | |
| ENTER | = one of above | New option selected (? disappears) |
| | PV | |
| | | Read the current value of the process variable (subscripted for Cascade and Selector only) |
| PV k | PV k | k = 1,2 (= 2 for Selector, Cascade Models) |
| READ | = nnnnnn* | Value in engineering units |
| | PV ALM | |
| | | Read/enter the upper and lower alarms on PV1 |
| PV ALM k | PV ALM k | k = 1 for low alarm |
| | | k = 2 for high alarm |
| READ | = nnnnnn* | Alarm value in engineering units |
| m m ... m | mmmmmm* | New value being entered |
| ENTER | = mmmmmm* | Value entered (note equal sign) |
| | DEV | |
| | | Read the current value of deviation (SP-PV) (subscripted for Cascade and Selector) |
| DEV k | DEV k | k = 1,2 (= 2 for Selector, Cascade Models) |
| READ | = nnnnnn* | Value in engineering units |
| | DEV1 ALM | |
| | | Read/enter the alarm limits on deviation (PID 1 only) |
| DEV1 ALM | DEV1 ALM | |
| READ | = nnnnnn* | Current value in engineering units |
| m m ... m | mmmmmm* | New value being entered |
| ENTER | = mmmmmm* | Value entered (note equal sign) |
| | ALM ACK | |
| ALM ACK | ALM ACK | Read and acknowledge the current state of the alarms. Display remains the same. Flashing of bar graph or leds is stopped; ie. alarm acknowledged. |
| READ | CPREDLH | H = PV high alarm |
| | | L = PV low alarm |
| | | D = deviation alarm |
| | | E = DAC zero reference calibration |
| | | R = RAM re-initialized |
| | | C = computer fail DI for DDC or CMPTR |
| | | P = Long power down |
| | | NOTE: Only the active |

TABLE 2-continued

| KEYBOARD SEQUENCE | DISPLAY SEQUENCE | COMMENTS |
|---|---|---|
| | | alarms will be indicated. If there are no alarms, only blanks are displayed. |
| | PID OP | |
| | | Read the PID algorithm type |
| PID OP READ | PID OP = I/A | "Interacting" |
| | KP | |
| | | Read/enter the PID proportional tuning constants Kp(1), Kp(2), Kp(3) |
| KP k | KP k | The subscript is only used in the following cases:<br>(a) If the advanced tuning option is installed, k = 1, 2, 3<br>(b) If selector or Cascade models, then Kp3 will be used for the second PID controller |
| READ | = nnnnnnP | Value |
| m m ... m | mmmmmmP | New value being entered |
| ENTER | = mmmmmmP | Value entered (note equal sign) |
| | KI | |
| | | Read/enter the integral constant KI |
| KI k | KI k | See notes for KP on subscripts |
| READ | = nnnnnnI | Value either in repeats per minute, repeats per second, minutes or seconds. (Press SHIFT UNITS to read current units) |
| m m ... m | nnnnnnI | New value being entered |
| ENTER | = nnnnnnI | Value entered (note equal sign) |
| | KD | |
| | | Read/enter the derivative constant KD |
| KD k | KD k | See notes for KP |
| READ | = nnnnnnD | Value in minutes or seconds. (Press SHIFT UNITS to read current units) |
| m m ... m | nnnnnnD | New value being entered |
| ENTER | = nnnnnnD | Value entered (note equal sign) |
| | TV OP | |
| | | Read/enter the tuning variable option (only if advanced tuning enabled) |
| TV OP | TV OP | |
| READ | = OFF | = off |
| | = PV1 | = primary PV |
| | = DEV | = Deviation |
| | = [DEV] | = "magnitude" of deviation (for error squared) |
| | = VPFB | = Valve position feedback |
| | = AI5 | = Linearized AI5 |
| | = DI's | = TV determined by digital inputs |
| ↑ ... ↓ | = one of above? | New option being selected |
| ENTER | = one of above | New option selected (? disappears) |
| | P OP, I OP, D OP | |
| | | Read/enter the breakpoint option for Kp, KI, KD (only if advanced tuning enabled) Each of these keys is similar in function |
| P OP | P Op | |
| I OP | I OP | |
| D OP | D OP | |
| READ | = STEP | 2 options |
| | = SLOPE | |
| ↑ ... ↓ | = one of above? | New option being selected |
| ENTER | = one of above | New option selected; (? disappears) |
| | FF OP | |
| | | Read/enter the feedforward enable (subscripted for Cascade and Selector only |
| FF OP k | FF OP k | k = 1,2 (for PID1, PID2 respectively) |
| READ | = OFF | = No feedforward to PID k |
| | = ON | = Feedforward enabled to PID K |
| ↑ ... ↓ | = one of above? | New option being selected |
| ENTER | = one of above | New option selected (note equal sign) |
| | FF IN | |
| | | Read the input value to the FF Block |
| FF IN READ | FF IN = nnnnnn% | Value in % |
| | FF k | |
| FF k | FF k | k = 1 for FF gain<br>k = 2 for FF lead<br>K = 3 for FF lag |
| READ | = nnnnnn | The value in units; the units are:<br>FF LEAD = Minutes or seconds<br>FF LAG = Minutes or seconds<br>FF GAIN = No units<br>NOTE: Press SHIFT UNITS to read lead and lag units. |
| m m ... m | mmmmmm | New value being entered |
| ENTER | = mmmmmm | Value entered |
| | FF OUT | |
| | | Read the output value of FF block |
| FF OUT READ | FF OUT = nnnnnn% | Value in % |
| | AO 3 | |
| AO 3 | AO 3 | Read the current value of the auxiliary analog output #3. |
| READ | = nnnnnn% | Value in percent |
| | OUT3 OP | |
| OUT3 OP | OUT3 OP | Read/enter the output range of AO3 |
| READ | = 0-5V | 0-5 volt range |
| | = 1-5V | 1-5 volt range |
| ↑ ... ↓ | = one of above? | New value being selected |
| ENTER | = one of above | New value selected (? disappears) |
| | AO3 OP | |
| | | Read/enter the A03 (auxiliary output) option |
| A03 OP READ | A03 OP = OUT | = CONTROLLER Output |
| | = SP | = SETPOINT |
| | = PV | = PROCESS VARIABLE (calculated) |
| | D03 OP | |
| | | Read the D03 option |
| D03 OP READ | D03 OP = PV ALM | = "PV Alarm" indication |
| | = MODE 4 | = "Mode 4" indication |
| ↑ ... ↓ | = one of above? | New option being selected |
| ENTER | = one of above | Selected |
| | OUT OP | |
| | | Read the output option |
| OUT OP READ | OUT OP = 0-5V | = 0-5V analog output |
| | = 1-5V | = 1-5V analog output |
| | = STEP | = stepper |
| | = PULSE | = pulse |
| | INHB OP | |
| | | Read/select the "inhibit raise" and "inhibit lower" options for the controller |

TABLE 2-continued

| KEYBOARD SEQUENCE | DISPLAY SEQUENCE | COMMENTS |
|---|---|---|
| INHB OP READ | INHB OP = OFF = DI | output = not used = determined by appropriate DI |
| ↑ ... ↓ ENTER | = one of above? = one of above | New option selected |
| | H/L SEL | Read the high/low selector option (selector model only) |
| H/L SEL READ | H/L SEL = HI | Controller's output = MAX (PID1, PID2) |
| | = LO | Controller's output = MIN (PID1, PID2) |
| ↑ ... ↓ ENTER | = one of above? = one of above | New option being selected Selected |
| | DB | Read/enter the deadband value to be applied to the output. |
| DB k READ mmmmmm ENTER | DB k = nnnnnn% = mmmmmm% = mmmmmm% | Value in % New value being entered New value entered (? disappears) |
| | VPFB | Read the controllers latest output value position (AI6) |
| VPFB READ | VPFB = nnnnnn% | Value in % |
| | OUT | Read/Slew the value of the controller output |
| OUT READ | OUT = nnnnnn% | Value in % |
| | DO | Read the value of the 6 digital outputs |
| DO k READ | DO k = ON = OFF | k = 1–6 = HI = 24V = LO = 0V |
| | DDC OUT | Read the current DDC computer's output (DDC model only) |
| DDC OUT READ | DDC OUT = nnnnnn% | Value in % |
| | H OVR OP | Read/select the high-override option for the output |
| H OVR OP READ | H OVR OP = ON = OFF | = Linear input AI5 = Disabled |
| ↑ ... ↓ ENTER | = one of above? = one of above | New option being selected New option selected (? disappears) |
| | L OVR OP | Read/select the low-override option |
| L OVR OP READ | L OVR OP = ON = OFF | = Linear input AI4 = Disabled |
| ↑ ... ↓ ENTER | = one of above? = one of above | New option being selected New option selected (? disappears) |
| | H OVR | Read the current value of the analog high-override (AI5.LIN) |
| H OVR READ | H OVR = nnnnnn% | Value in % |
| | L OVR | Ride in the current value of the analog low-override (AI4.LIN) |
| L OVR READ | L OVR = nnnnnn% | Value in % |
| | OUT HL | Read/enter the value of the output high limit |
| OUT HL READ m m ... m ENTER | OUT HL = nnnnnn% mmmmmm% = mmmmmm% | Value in % New value being entered New value entered (note equal sign) |
| | OUT LL | Read/enter the value of the output low limit |
| OUT LL READ m m ... m ENTER | OUT LL = nnnnnn% mmmmmm% = mmmmmm% | Value in % New value being entered New value entered (note equal sign) |
| | MODE | Read/select the controller mode. The modes are model dependent; see table below |
| READ ↑ ... ↓ ENTER | = LOC etc. = XXX? = XXX | New mode being selected Mode selected |

The following table lists the modes displayed for each model.

| | | | MODEL | | | | |
|---|---|---|---|---|---|---|---|
| MODE | L-M | L-M-R | L-M-CMPTR | A-M-DDC | RATIO | CASCADE | SELECTOR |
| 1 | LOC | LOC | LOC | LOC | LOC | LOC | LOC |
| 2 | MAN | MAN | MAN | MAN | MAN | MAN | MAN |
| 3 | — | RMT/1 | RMT/1 | RMT/1 | RMT/1 | RMT/1 | RMT/1 |
| 4 | — | — | — | — | — | SEC/2 | SEC/2 |

| KEYBOARD SEQUENCE | DISPLAY SEQUENCE | COMMENTS |
|---|---|---|
| | EU 0% EU 100% | Read/enter the engineering unit "scaling" values, to enable conversion from the controller's internal 0–100% range, to any desired range of engineering units (linear conversion) Subscripted for Cascade and Selector k = 1 for SP1/PV1 k = 2 for SP2/PV2 |
| EU 0% k EU 100% k READ m m ... m ENTER | EU 0% k EU 100% k = nnnnnn mmmmmm = mmmmmm | Value (no units) New value being selected Value entered (note equal sign) |
| | EU ID | |
| EU ID | ALPHA | Depressing CLR key causes Switch to the alphanumeric overlay. |
| | AUTH | No change in display Enable |

| KEYBOARD SEQUENCE | DISPLAY SEQUENCE | COMMENTS |
|---|---|---|
| | | -continued |
| | | (authorize the ability to enter protected configuration data). |
| | | NEXT |
| NEXT | Next item displayed | Go to the next operation/function/subscript The next function will automatically be fetched as if that key(s) had been pressed. Normal key sequences may then be keyed in. The next key is the complete sequentially ordered list of functions accessible by the NEXT key. |
| ↑   ↓ | | Raise or lower (slew) the numerical value being currently displayed. (If changeable) Select options. |
| | | DIAG |
| DIAG | DIAG | Switch to the diagnostics overlay. |
| | | CLR |
| CLR | | Clear operation |
| | | COMM |
| | | Function not finalized (configures the communication interface). |
| | | ENTER |

| KEYBOARD SEQUENCE | DISPLAY SEQUENCE | COMMENTS |
|---|---|---|
| ENTER | = Display | Enters a new value or option. |
| | | ID |
| ID | current ID | Display the identifier of the current selected variable. |
| | | READ |
| READ | = XXXXXX | Read the currently selected variable. |
| | | UNITS |
| UNITS | units | Display the Engineering units ID for this variable |
| | | SHIFT |
| SHIFT | No Change | Enable the upper case keys. |

TABLE 3

| ITEMS ID | SUBSCRIPT | COMMENTS |
|---|---|---|
| MODEL | | Displayed on power up. |
| IN OP | 6 | |
| LIN OP | 6 | |
| FLTR | 6 | |
| L/R SP | (2) | Only on for DDC and two for SELECTOR models |
| TRK OP | | |
| RAT MAX | | Only for RATIO model |
| L/R RAT | | Only for RATIO model |
| SRC OP | | Only for CMPTR and DDC models |
| FAIL OP | | Only for CMPTR and DDC models |
| SAFE SP | | Only for CMPTR and DDC models |
| RSP HL | (2) | Not used for LM model Two for SELECTOR. |
| RSP LL | (2) | Not used for LM. Two for SELECTOR. |
| PV1 OP | | |
| PV ALM | 2 | |
| DEV ALM | | |
| PID OP | | |
| KP | (3) | No subscript except with CASCADE |
| KI | (3) | and SELECTOR models, or with |
| KD | (3) | ADVANCED TUNING option enabled. |
| T UNITS | | |
| TV OP | | Only when Advanced Tuning enabled |
| P Op | | Only when Advanced Tuning enabled |
| I Op | | Only when Advanced Tuning enabled |
| D OP | | Only when Advanced Tuning enabled |
| TV BKPT | | Only when Advanced Tuning enabled |
| FF OP | (2) | Subscript only CASCADE and SELECTOR |
| FF k | 3 | |
| INHB OP | | |
| OUT OP | | |
| A03 OP | | |
| OUT3 OP | | |
| DO3 OP | | |
| HOVR OP | | |
| OUT HL | | |
| OUT LL | | |
| H/L SEL | | Only for SELECTOR model |
| EU 0% | (2) | Subscripted for CASCADE and SELECTOR |
| EU 100% | (2) | Subscripted for CASCADE and SELECTOR |
| EU ID | (2) | Subscripted for CASCADE and SELECTOR |

Figure 2:
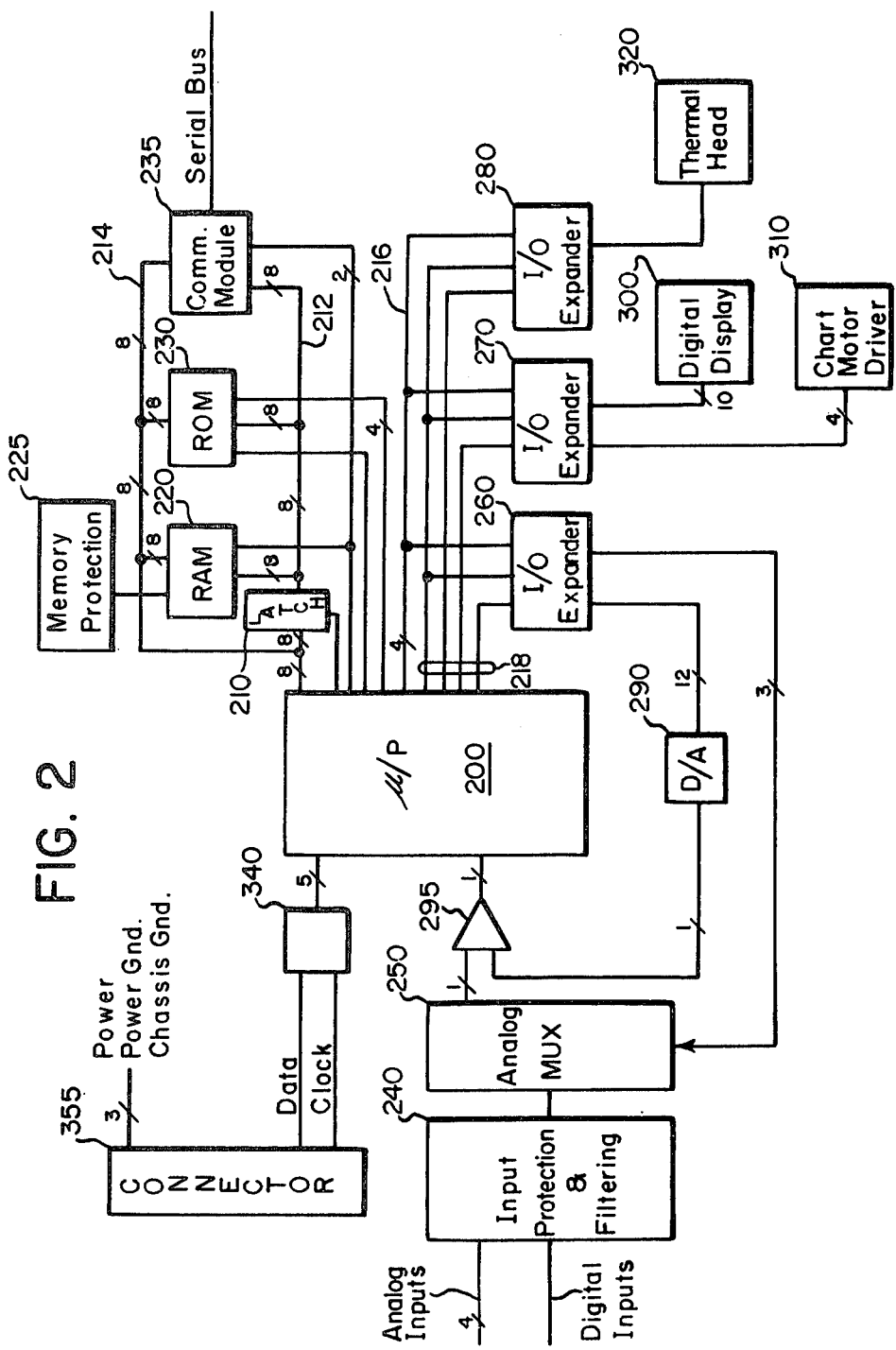
FIG. 2 is a schematic diagram of an illustrative embodiment of a recorder which can be used with the keyboard/display of FIG. 1.

FIG. 2 is a block diagram of an illustrative embodiment of a recorder which may be used with the intelligent keyboard/display of the present invention to print alphanumeric or graphic displays. As shown therein, the recorder comprises a microprocessor 200, a latch 210, a random access memory (RAM) 220, a memory protection circuit 225, a read only memory (ROM) 230, a serial communication module 235, an input protection and filtering circuit 240, an analog multiplexer 250, I/O expanders 260, 270, 280, digital to analog converter 290, a comparator 295, a digital display 300, a chart motor driver 310, a thermal printing head 320, communications multiplexer 340 and connector 355.

Microprocessor 200 illustratively is an Intel 8039/8049 microprocessor. Latch 210 is a 373-type octal D-type flip-flop which controls an address bus 212 in response to a signal from microprocessor 200. Address bus 212 provides eight bits of address to RAM 220, ROM 230 and the communication module. Data from these units is returned to microprocessor 200 on an eight bit parallel data bus 214. RAM 220 is a pair of 5101-type 256×4 bit CMOS memory chips connected together to provide 256 bytes of random access storage. Two control lines from microprocessor 200 control the operation of writing into and reading from these chips. RAM 220 is used for both temporary storage of data that is to be printed by the recorder and configuration data. The stored data is protected against power failure by a long-life battery in memory protection circuit 225. ROM 230 is three units of 2K×8 bit memory such as a 2716-type read only memory. Each ROM unit is addressed by the eight address lines of bus 212 and three additional address lines. Two additional lines plus control logic (not shown) select the individual ROM chip. The operating program for the recorder is stored in ROM 230.

There are up to four analog and three digital inputs to the recorder. Protection against voltage excursions and high-frequency transients is provided by input protection and filtering circuit 240. The filtered analog and digital signals are applied to analog multiplexer 250. Multiplexer 250 illustratively is a 4051-type one-out-of-eight multiplexer whose output is selected by three of the lines from I/O expander 260. The analog output of multiplexer 250 is converted to a digital signal by means of twelve bit digital-to-analog converter 290, comparator 295 and a standard analog-to-digital programming routine which is executed by microprocessor 200. Digital signals may also be supplied to the recorder by the communication module which illustratively is the same as module 16 described in the above-referenced "Single Loop Control System".

I/O expanders 260, 270, 280 are connected to microprocessor 200 via data bus 216 and select lines 218. I/O expander 270 provides for signal outputs to digital display 300 and chart motor driver 310. I/O expander 280 provides for signal outputs to thermal printing head 320.

Communication multiplexer 340 is a 75138-type multiplexer which is used to multiplex incoming and outgoing clock and data signals. Connector 355 mates with connector 155 of the intelligent keyboard/display and provides for the transmission of clock and data signals to and from the intelligent keyboard/display.

Digital display 300 is illustrated in greater detail in FIG. 3. As shown therein, the digital display comprises a seven segment decoder 410, a decoder 420, drivers 430, 440 and a display 450 capable of displaying four groups of four digits each. As shown in FIG. 3, each digit is represented by a seven segment display; and a decimal point can be located to the left of any one of the four digits in a row. Decoder 420 has four signal input lines and sixteen signal output lines. In response to a four bit parallel input signal, it strobes one of the sixteen different digits of display 450 so as to illuminate the segments of that digit's seven segment display in accordance with the signals from seven segment decoder 410. The seven segment decoder 410 has four inputs which specify the 10 numeric digits plus special symbols. The seven outputs of decoder 410 specify which of the seven segments of the display of a given character are illuminated. The eighth line which is applied directly to driver 430 controls the display of the decimal point. In order to display a minus sign, the center horizontal bar of the seven segment display can be controlled from the microprocessor. Seven segment decoder 410 illustratively is a 47-type BCD-to-7-segment decoder and decoder 420 is a 4514 decoder. The seven segment drivers 430 are illustratively a pair of 2907-type drivers and the digit select drivers 440 are illustratively a pair of 2813-type drivers.

The thermal printing head is depicted in greater detail in FIG. 4. As shown therein, the printing head comprises a set of latch/drivers 510, a set of latch/drivers 520, a pulse width control 530, a thermal head temperature sensor 540 and a thermal printing head 550. The thermal printing head illustratively is a commercial device such as the DM 69414 printing head manufactured by Gulton Industries, Inc. of Metuchen, New Jersey. This printing head contains a single continuous row of printing elements spaced so as to print one hundred dots per inch on a strip that is slightly more than four inches wide. The printing head uses a total of sixty-nine address lines and nine strobe lines to deliver to the individual printing elements sufficient current to print visible indicia on a recording medium 560, such as a thermal paper. Latch/drivers 510 consist of an array of latches and drivers suitable for driving the sixty-nine address lines. Latch/predrivers 520 provide an array of latches and drivers suitable for driving the strobe lines.

Advantageously the intensity or gray scale of the print may be controlled by means of thermal head temperature sensor 540 and pulse width control 530. The intensity of the printed indicia will decrease with decreasing ambient temperature of the thermal head. To compensate for this, it has been found advantageous to adjust the length of the electrical pulse used for printing.

To read data from or enter data into the recorder of FIG. 2, the intelligent keyboard/display is plugged into the recorder by mating connectors 155 and 355. The keyboard/display will then determine that it has been connected to a recorder and will display RECORDR on display 170. At the same time the keyboard/display selects the recorder operating program which defines the keys of keyboard 190 as shown in Table 4. The keyboard sequence and display sequence in response thereto and explanatory comments relating to these keys are set forth in Table 5.

One particular application to which the combination of keyboard/display and recorder may be put is the hard copy printout of data stored in random access memory 120 of the keyboard/display. Data may be stored in RAM 120 from any single loop control instrument to which the keyboard/display is connected. The data may then be read from the keyboard display into RAM 220 of the recorder.

TABLE 4

| RECORDER | | | | |
|---|---|---|---|---|
| INPUT OPTION | INPUT SCALE | INPUT BIAS | INPUT SOURCE | INPUT FILTR |
| INPUT VOLTS | TRACE VALUE | TEMP SCALE | LOW ALARM | HIGH ALARM |
| PRI DIV | SEC DIV | | | PAPER ADV |

TABLE 4-continued

RECORDER

| CHART SPEED | ACTIVE SPEED | CHART UNITS | DMD PRINT |
|---|---|---|---|
| DAY | MONTH | YEAR | HOUR | MIN |
| STATUS ALARM ACKN | TRACE ALARM ACKN | 7 | 8 | 9 |
| ID | ↑ ↑ | COMM | | |
| NEXT | ↑ | 4 | 5 | 6 |
| ENTER | ↓ ↓ | EU 0% | EU 100% | EU ID |
| READ/GO | ↓ | 1 | 2 | 3 |
| | | AUTH | UNITS | DIAG |
| CLEAR | SHIFT | 0 | . | +/− |

TABLE 5

| KEYBOARD SEQUENCE | DISPLAY SEQUENCE | COMMENTS |
|---|---|---|
| INPUT OPTION | | |
| | | Read/Enter the linearization option for each of the 4 analog inputs (13 choices) |
| INPUT OPTION k READ | LINOP k | k = 1–4 |
| | = V**5/2 | Five halves |
| | = V**3/2 | Three halves |
| | = V**½ | Square root |
| | = V | Direct |
| | = OFF | Off |
| | = PTNM | Platinum RTD |
| | = NKL | Nickel RTD |
| | = TCT | Type T thermocouple |
| | = TCR | Type R thermocouple |
| | = TCS | Type S thermocouple |
| | = TCK | Type K thermocouple |
| | = TCJ | Type J thermocouple |
| | = TCE | Type E thermocouple |
| ↑ … ↓ | = One of above? | ? Appended to non-active option |
| ENTER | = One of above | Other option selected - (? Disappears) |
| INPUT SCALE | | |
| | | Scale for DAC analog Input to Pre-conditioned Input conversion |
| INPUT SCALE k READ | INSCAL k = nnnn | k = 1–4 Unitless |
| mm … m | mmmmm | New scale factor |
| ENTER | = mmmmm | New scale factor entered (Note equal sign) |
| INPUT BIAS | | |
| | | Bias for DAC Analog Input to Pre-conditioned Input Conversion. |
| INPUT BIAS k READ | INBIAS k = nnnn | k = 1 to 4 Unitless |
| mm … m | mmmmm | New Bias Factor |
| ENTER | = mmmm | New Bias Factor Entered (Note Equal Sign) |
| INPUT SOURCE | | |
| from Serial | | Analog Input from MUX or Communications Line |
| INPUT SOURCE k READ | INSRC k = ANALOG = COMM | k = 1 to 4 Analog Input Mux Serial communications |
| ↑ … ↓ | = one of above? | ? Appended to now active option |

TABLE 5-continued

| KEYBOARD SEQUENCE | DISPLAY SEQUENCE | COMMENTS |
|---|---|---|
| ENTER | = one of above | Inactive Option selected (? disappears) |
| INPUT FILTER | | |
| | | READ/ENTER the Software filter (0.15HZ) option for each Analog Input |
| INPUT FILTER k READ | FLTR k = OFF = ON | k = 1 to 4 one of 2 options 1.5 HZ filter .15 HZ filter |
| ↑ … ↓ | = one of above? | ? Appended to non-active option |
| ENTER | = one of above | In Active option selected (? disappears) |
| INPUT VOLTS | | |
| | | Read the four analog input values (in volts) |
| INPUT VOLTS k READ | AI k = nnnnn V | K = 1 to 4 |
| TRACE VALUES | | |
| | | Read the Trace Value |
| TRACE VALUE k READ | TRACE k = nnnnn* | k = 1 to 4 Trace Value in Engineering Units |
| TEMP SCALE | | |
| | | Read/Enter Temperature Scale desired for RTD and thermocouple Lineariation |
| TEMP SCALE k READ | Temp k = DEG C = DEG F | k = 1 to 4 Celsius Fahrenheit |
| ↑ … ↓ | = one of above? | ? appended to non-active option |
| ENTER | = one of above | Other option selected (? Disappears) |
| CHART SPEED | | |
| | | READ/ENTER Chart Speed |
| CHART SPEED k READ | CHSPD K = nnnn | k = 1 or 2 Chart Speed in chart units |
| mm.m | mmmmm | New speed being entered |
| ENTER | = mmmmm | New value entered (note equal sign) |
| ACTIVE SPEED | | |
| | | Read which chart speed is presently selected |
| ACTIVE SPEED READ | SPDACT = SPD1 = SPD2 | Chart speed 1 selected Chart speed 2 selected |
| CHART UNITS | | |
| | | READ/ENTER the units for the chart speed and time |
| CHART UNITS READ | UNITS = CM = IN | |
| ↑ … ↓ | = one of above? | ? appended to non-active option |
| ENTER | = one of above | new option selected (? disappears |
| DMD PRINT | | |
| | | READ/ENTER |

TABLE 5-continued

| KEYBOARD SEQUENCE | DISPLAY SEQUENCE | COMMENTS |
|---|---|---|
| | | Demand print condition |
| DMD PRINT READ | DMDPRT | |
| | = OFF | Demand print inactive |
| | = GO | Demand print active |
| ↑ ... ↓ | = one of above ? | ? appended to non-active condition |
| ENTER | one of above | new condition selected (? disappears) |
| | DAY, YEAR, HOUR, MIN | |
| ALL SIMILAR DESCRIBED TOGETHER | | READ/ENTER Time of Day and Date |
| DAY | DAY | |
| YEAR | YEAR | |
| HOUR | HOUR | |
| MIN | MIN | |
| READ | = nn | |
| mm | mm | new value |
| ENTER | = mm | new value entered |
| | MONTH | |
| | | READ ENTER Month |
| MONTH READ | MONTH | |
| | | one of 12 choices |
| | = JAN | JANUARY |
| | = FEB | FEBRUARY |
| | = MAR | MARCH |
| | = APR | APRIL |
| | = MAY | MAY |
| | = JUN | JUNE |
| | = JUL | JULY |
| | = AUG | AUGUST |
| | = SEP | SEPTEMBER |
| | = OCT | OCTOBER |
| | = NOV | NOVEMBER |
| | = DEC | DECEMBER |
| ↑ ... ↓ | = one of above? | ? appended to non-selected month |
| ENTER | = one of above | new month selected (? disappears) |
| | STATUS ALARM ACKN | |
| | | Read Status of Recorder Hardware Alarms/ Achknowledge the alarms |
| STATUS ALARM ACKN READ | DACALM | |
| | = D | DAC out of calibration |
| | C | Computer/Async comm failure |
| | M | Recorder in default config. |
| | P | Paper out or chart off |
| | TRACE ALARM ACKN | |
| | | Read Trace Alarm Conditions/ Acknowledge Led |
| TRACE ALARM ACKN READ | ALMSTS 1x2x3x4x Trace numbers and alarm conditions shown | |
| | | x= H Trace in High Alarm |
| | | x= L Trace in Low Alarm |
| | | x= Blank Trace normal |
| | EU 0% | |
| | EU 100% | |
| | | Read/Enter the engineering unit "scaling" values, to enable conversion from the Recorder's internal 0-100% range, to any desired range of engineering units (linear conversion) |
| EU 0% k | EU 0% k | k = 1 |
| | | k = 2 |
| EU 100% k READ | EU 100% k = nnnnnn | value (no unit) |
| mm ... m | mmmmmm | New value being selected |
| ENTER | = mmmmmm | Value entered (note equal sign) |
| | EU ID | |
| EU ID | ALPHA | Switch to the alphanumeric overlay, selected for engineering unit labels. |
| | NEXT | |
| | | Go to the next operation/functional/ subscript. |
| NEXT | Next item displayed | The next function will automatically be fetched as if that key(s) had been pressed in the complete sequentially ordered list of functions accessible by the NEXT key |
| | ↑ ... ↓ | |
| ↑↑ ↓↓ | | Raise or lower (slew) the numerical value being currently displayed (If changeable Select options |
| | DIAG | |
| | | Switch to the diagostics overlay. |
| DIAG | DIAG | Details not yet finalized. |
| | CLR | |
| CLR | | Clear operation |
| | COMM | |
| | | Function not finalized (configures the communication interface) |
| | ENTER | |
| ENTER | = Display | Enters a new value or option. |
| | ID | |
| ID | current ID | Display the identifier of the currently selected variable. |
| | UNITS, SHIFT | |
| UNITS | Units | Display the Engineering units ID for this variable. |
| SHIFT | No Change | Enable the upper case keys. Also performs a fast numeric slew. |

In accordance with programming routines stored in ROM 230 of the recorder, the contents of RAM 220 may then be printed by thermal printing head 320 on an appropriate recording medium 560. Advantageously, the keys of the keyboard/display can also be configured as an alphanumeric keyboard for entry of text onto the hard copy output of the recorder.

From the program description it will be apparent that the intelligent keyboard/display provides a versatile device for reading data from and entering data into different computer controlled instruments. Of particular interest, the keyboard/display provides a means for reconfiguring these instruments by selecting various options, a means for determining the particular options selected and a means for storing the configuration of a particular instrument. Finally, in connection with a recorder the keyboard/display provides for hard copy output.

As will be apparent to those skilled in the art, numerous modifications may be made in the above described apparatus without departing from the spirit and scope of the invention. Further, from the details concerning the function and operation of the various keys and displays, suitable software can be devised to implement any or all of the functions desired.

What is claimed is:

1. A keyboard/display unit comprising:
   a first microprocessor,
   a keyboard having a plurality of keys through which data and/or commands may be supplied to said first microprocessor,
   a display controlled by said first microprocessor
   a read only memory in which is stored an operating program for said first microprocessor, said operating program defining the functions associated with at least some of said keys of said keyboard, and
   means for connecting said keyboard/display unit to one of a plurality of other instruments for supplying data and/or commands to said instrument from said keyboard/display unit and for providing information from said instrument to said keyboard display unit, said keyboard/display unit being responsive to signals from the particular instruments to which said keyboard/display unit is connected to that upon receipt at said unit of a signal from a first type of instrument at least some of said keys of said keyboard are defined by said operating program to have first functions with respect to the input of data and/or commands to said first type of instrument and upon receipt at said unit of a signal from a second type of instrument said keys are defined by said operating program to have second functions with respect to the input of data and/or commands to said second type of instrument, whereby the same keys supply different data and/or commands to different types of instruments upon being connected thereto.

2. In combination with the apparatus of claim 1, a plurality of process control instruments each of which comprises:
   a second microprocessor,
   means for connecting said process control instrument to said keyboard/display unit via the connecting means of said unit,
   at least one input in addition to said connecting means,
   at least one output, and
   at least one option in the processing of said one input to form said one output, the particular option being selectable by operation of the keyboard of said keyboard/display unit.

3. The keyboard/display unit of claim 1 further comprising a random access memory in which may be stored data derived from one instrument when said keyboard/display unit is connected thereto and from which may be read data for input to another instrument when said keyboard/display unit is connected thereto.

4. In an industrial process control system in which process variables are measured and such measurements are used by control instruments in developing process control signals, a keyboard/display unit comprising:
   a first microprocessor,
   means for connecting said keyboard/display unit to one of a plurality of control instruments for supplying data and/or commands to said control instrument from said keyboard/display unit and for providing information from said control instrument to said keyboard/display unit,
   a keyboard having a plurality of keys through which data and/or commands may be supplied to said microprocessor for input to a control instrument to which said keyboard/display unit is connected, said data and/or commands being used by said control instrument to determine the type of process control signals that are developed,
   a display controlled by said first microprocessor, and
   a read only memory in which is stored an operating program for said first microprocessor, said operating program defining the functions associated with at least some of said keys of said keyboard,
   said keyboard/display unit being responsive to signals from the particular control instruments to which said keyboard/display unit is connected so that upon receipt at said unit of a signal from a first type of control instrument at least some of said keys of said keyboard are defined by said operating program to have first functions with respect to the input of data and/or commands to said first type of control instrument and upon receipt at said unit of a signal from a second type of control instrument said keys are defined by said operating program to have second functions with respect to the input of data and/or commands to said second type of control instrument, whereby the same keys supply different data and/or commands to different types of control instruments upon being connected thereto.

5. In combination with the apparatus of claim 4, a plurality of process control instruments each of which comprises:
   a second microprocessor,
   means for connecting said process control instrument to said keyboard/display unit via the connecting means of said unit,
   at least one input in addition to said connecting means,
   at least one output, and
   at least one option in the processing of said one input to form said one output, the particular option being selectable by operation of the keyboard of said keyboard/display unit.

6. The keyboard/display unit of claim 4 further comprising a random access memory in which may be stored data derived from one control instrument when said keyboard/display unit is connected thereto and from which may be read data for input to another instrument when said keyboard/display unit is connected thereto.

* * * * *